(12) United States Patent
Inoue

(10) Patent No.: US 6,954,292 B2
(45) Date of Patent: Oct. 11, 2005

(54) IMAGE SCAN APPARATUS AND FOCUS CONTROL METHOD

(75) Inventor: Toshiyuki Inoue, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 909 days.

(21) Appl. No.: 09/950,715

(22) Filed: Sep. 13, 2001

(65) Prior Publication Data

US 2002/0030756 A1 Mar. 14, 2002

(30) Foreign Application Priority Data

Sep. 13, 2000 (JP) .......................................... 2000-277451

(51) Int. Cl.[7] ........................... H04N 1/04; H04N 1/047
(52) U.S. Cl. ...................... 358/475; 358/487; 358/444; 358/474; 358/406; 358/509; 358/506; 358/504
(58) Field of Search ................................ 358/475, 509, 358/487, 506, 406, 504, 444, 523, 474, 505, 497, 494, 465, 466; 348/96–98, 345, 346; 250/370.15, 234–236; 359/395, 820, 512, 210; 382/255, 312; 355/55, 56, 30

(56) References Cited

U.S. PATENT DOCUMENTS

| 4,982,216 A | * | 1/1991 | Kudo et al. ................... 396/97 |
| 5,767,989 A | * | 6/1998 | Sakaguchi .................. 358/474 |
| 5,768,021 A | * | 6/1998 | Ori ............................. 359/618 |
| 5,953,106 A | * | 9/1999 | Unno et al. ................... 355/55 |
| 6,665,097 B1 | * | 12/2003 | Inagaki ....................... 358/471 |
| 6,819,799 B1 | * | 11/2004 | Sakaguchi .................. 382/235 |

FOREIGN PATENT DOCUMENTS

| JP | 05053193 A | * | 3/1993 | ........... G03B/21/00 |
| JP | 9-51408 | | 2/1997 | ............ H04N/1/19 |
| JP | 9-152540 | | 6/1997 | ............ G02B/7/02 |
| JP | 2000-89374 | | 3/2000 | ........... G03B/27/34 |

OTHER PUBLICATIONS

Patent Abstracts of Japan 09–051408 Feb. 18, 1997.
Patent Abstracts of Japan 09–152540 Jun. 10, 1997.
Patent Abstracts of Japan 2000–089374 Mar. 31, 2000.

* cited by examiner

*Primary Examiner*—Cheukfan Lee
(74) *Attorney, Agent, or Firm*—Sughrue Mion, PLLC

(57) ABSTRACT

After scan conditions are determined by the pre-scan, a temperature of a focus lens unit is measured. When the difference between the measured temperature and a set temperature data stored in a RAM is less than 4° C., a focus position is calculated based on set focus position data in the RAM and temperature correction data which is decided according to the temperature difference. When the temperature difference is 4° C. or more, a focus search operation is carried out to detect the focus position. Focus position data and temperature data, obtained by the focus search operation, are written in the RAM as set focus position data and set temperature data. It is possible to omit the focus search operation if temperature fluctuation is small.

14 Claims, 10 Drawing Sheets

IMAGE SCAN APPARATUS AND FOCUS CONTROL METHOD

BACKGROUND OF THE INVENTION

1. Field of the Invention

The present invention relates to a focus control method for focusing a projection lens to form an optical image of an original, like a picture frame on a photo film, on a predetermined image surface, while taking consideration of deviations in focal point of the projection lens with temperature variations. The present invention also relates to an image scan apparatus having a projection lens, to scan an optical image of an original after focusing the projection lens by use of the focusing method.

2. Background Arts

There is a digital print system, in which an image scanner and a digital printer is provided. Scan light is projected toward a photo film with an image, which is focused on a CCD image sensor by use of a focus lens unit. The optical image scanned by the CCD image sensor is photoelectrically converted into digitalized image data. The scanned image is displayed after various image processing, and image data of the scanned image is sent to the digital printer to obtain a print. The digital print system has an advantage that the scanned image can be processed to control the image quality with more flexibility, compared to a conventional system that prints a film image onto a photographic paper directly without image processing.

The digital print system for scanning and recording the image is required to scan the image at high resolution and to reproduce the scanned image with excellent color tone. The digital print system is also needed to cope with various film sizes and various operations like trimming. Then, special optical materials, like fluorite and graded index with low dispersion glass, are used for the focusing lens unit. Usually, such a special optical material has large deviation in refractive index according to temperature change. Thus, focus position of the lens unit is fluctuated, which makes image quality of the scanned image worse.

In order to deal with the above problem, JP-A 9-51408 discloses an image reader which executes a focusing operation to detect a focus position between a pre-scan to determine a scan area and scan condition, and a fine-scan to scan the image at a high resolution. Moreover, JP-A 9-152540 discloses an image inputting lens device which includes a thermometer to detect a temperature of focus lenses, storage means to store standard movement data to a focus position at a standard temperature and correction movement data to move the lens device in accordance with temperature change. Based on these data in the storage means, the lens device calculates a provisional focus position and carries out focusing operation after moving the focus lenses to the provisional focus position. The above two inventions enable an effective focusing operation regardless of fluctuation in temperature of the focusing lenses.

In tile focusing operation, however, the focus position is detected by moving the focus lenses little by little in a search area after moving the lens device to the provisional focus position. Since the focusing operation requires certain time, it is difficult to shorten a whole scan time.

SUMMARY OF THE INVENTION

In view of the foregoing, an object of the present invention is to provide a focus control method to detect a focus position in a short while. Another object of the present invention is to provide an image scan apparatus for scanning an image after focusing operation by use of the focus control method.

To achieve the above objects, in a focus control method of focusing a projection lens to form an optical image of an original on an image sensor, wherein the projection lens and the image sensor being held by a support member that is movable along an optical axis of the projection lens, the focus control method comprises the following steps:

A. measuring a temperature of the projection lens during focusing the projection lens;

B. obtaining a temperature difference between the measured temperature and a predetermined set temperature;

C. when the temperature difference is less than a predetermined value, reading out a set focus position from a first memory, the first memory storing the set temperature of the projection lens and the set focus position at the set temperature;

reading out a correction amount from a second memory in accordance with the temperature difference, the second memory storing correction amounts corresponding to respective temperature differences;

calculating a corrected focus position based on the set focus position read out from the first memory and the correction amount read out from the second memory; and moving the support member to the corrected focus position, to focus the projection lens; and D. when the temperature difference is not less than the predetermined value, carrying out a focus search operation for searching a focus position of the support member while moving the support member along the optical axis, at the focus position a focal surface of the projection lens being located on the image sensor;

writing in the first memory a temperature of the projection lens measured during the focus search operation as a new set temperature, and the focus position obtained through the focus search operation as a new set focus position; and moving the support member to the new set focus position, to focus the projection lens.

According to the focus control method, since the focus search operation is omitted if temperature change is small, the total scanning time may be saved.

The image scan apparatus of the present invention comprises a projection lens; an image sensor; a thermometer for measuring a temperature of the projection lens; a support member for holding the image sensor and the projection lens, the support member being movable along an optical axis of the projection lens; focus control means for focusing the projection lens by controlling position of the support member along the optical axis, the focus control means carrying out a focus search operation for searching a focus position of the support member while moving the support member along the optical axis, at the focus position a focal surface of the projection lens being located on the image sensor; a first memory which stores the focus position obtained through the focus search operation as a set focus position, and a temperature of the projection lens measured through the thermometer as a set temperature; and a second memory which stores respective correction amounts on the set focus position in relation to temperature differences, wherein the focus control means obtains a temperature difference between a temperature of the projection lens measured during focusing the projection lens and the set temperature stored in the first memory, reads out one of the correction amounts from the second memory in accordance with the obtained temperature difference when the obtained temperature difference is less than a predetermined value, correcting the set focus position, stored in the first memory, with the read correction amount, to obtain a corrected focus position, and sets the support member to the corrected focus position.

In the preferable embodiment, the projection lens is variable in magnification, and the second memory stores the correction amounts for each of available magnifications. The focus control means moves the support member to the focus position after a pre-scanning operation, i.e. after an image is scanned at a low resolution for determining scanning conditions. Thereafter, a fine-scanning operation is carried out to scan the image at a high resolution.

The first memory may have a conjugate length table for sequentially storing respective couples of focus positions of the support member and temperatures of the projection lens which have been obtained through the focus search operations, as the set focus positions and the set temperatures. In this embodiment, the focus control means selects from the conjugate length table a nearest one of the set temperatures to the measured temperature that is measured during focusing the projection lens, and obtains a temperature difference between the selected set temperature and the measured temperature. When the temperature difference is less than the predetermined value, the focus control means selects one of the set focus positions that is related to the selected set temperature, and determines the corrected focus position based on one of the correction amounts that corresponds to the temperature difference, and the selected set focus position.

The temperature of the projection lens is measured a predetermined time before it is needed.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENT

Figure 1:
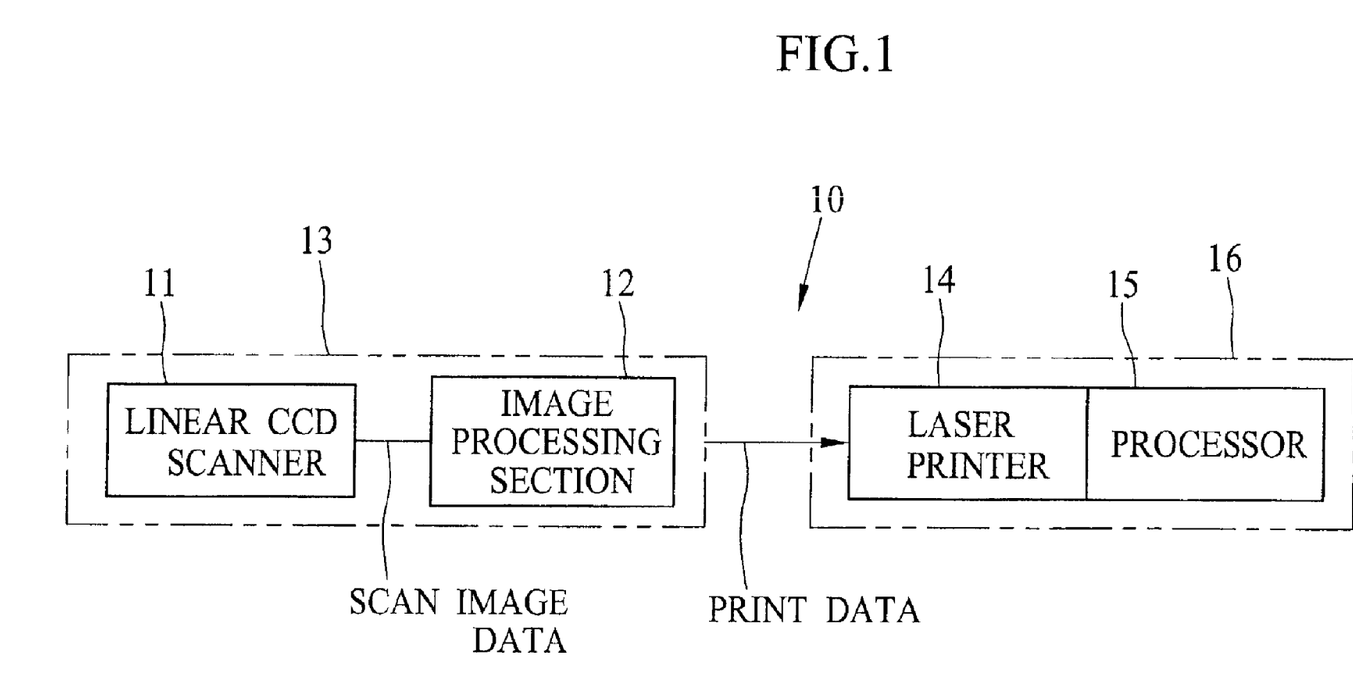
FIG. 1 is a block diagram of a digital print system with an image scan apparatus of the present invention.

As shown in FIG. 1, a digital print system 10 has an image scan apparatus 13 and an image print apparatus 16. The image scan apparatus 13 is consisted of a linear CCD scanner 11 and an image processing section 12, and the image print apparatus 16 is consisted of a laser printer 14 and a processor 15.

Figure 2:
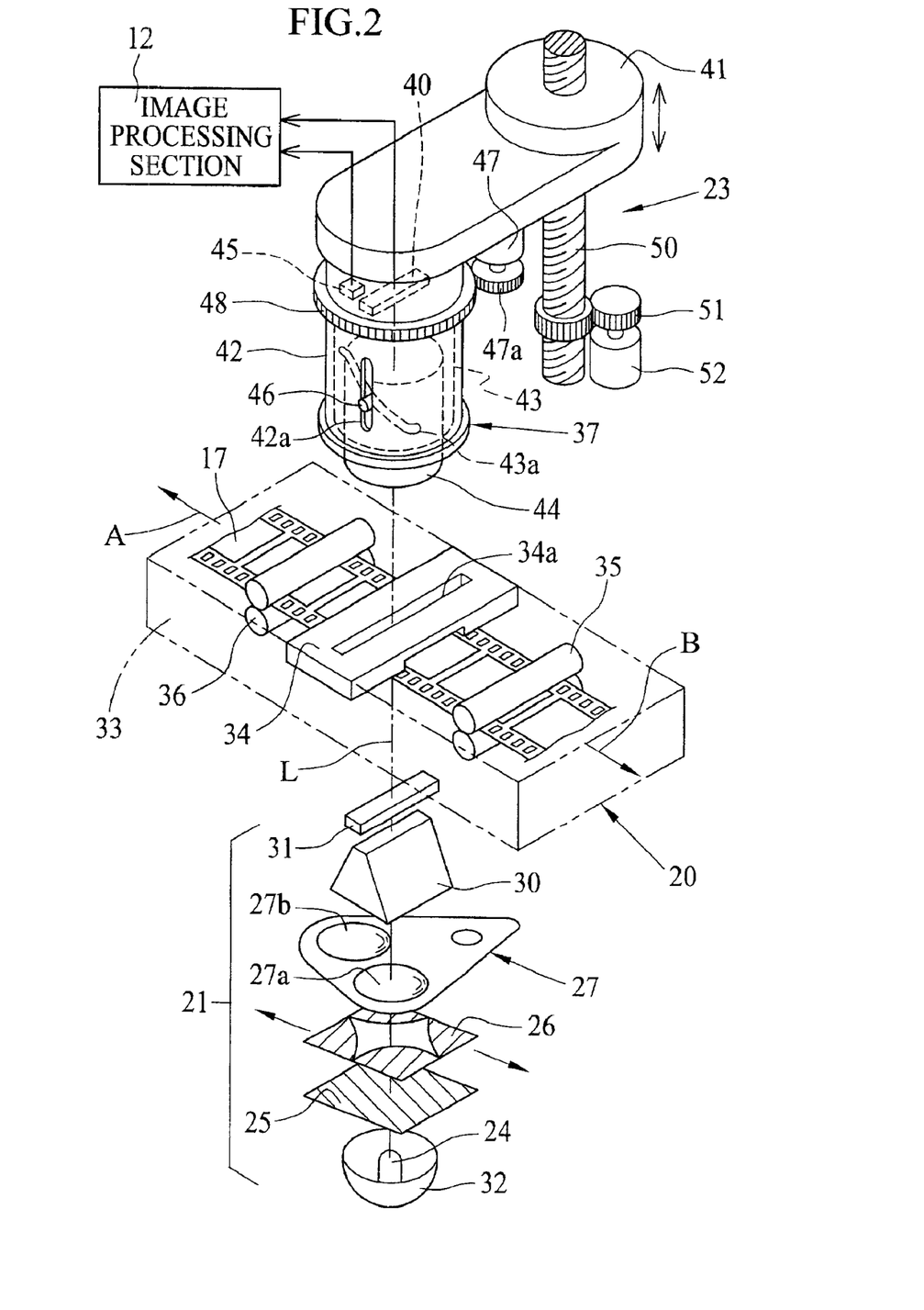
FIG. 2 is a schematic view of the image scan apparatus.

In FIG. 2, the linear CCD scanner 11 scans an image on a photo filmstrip 17, such as a negative film and a reversal film, and photoelectrically converts the scanned image into digitalized image data which is sent to the image processing section 12. The linear CCD scanner 11 includes a film carrier 20 for holding and feeding the photo filmstrip 17, a scan light source 21 located below the film carrier 20, and an image scan section 23. The image scan section 23 is positioned above the film carrier 20 in an exchangeable manner.

The scan light source 21 includes a lamp 24 for emitting scan light, such as a metal halide lamp and a halogen lamp. A light emitting diode (LED) may be used instead of the lamp 24. The lamp 24 is partially covered with a reflector 32, which reflects the scan light toward the photo filmstrip 17.

Between the lamp 24 and the film carrier 20, there are an infrared cut filter 25, a diaphragm 26, a balance filter 27, a light diffusion box 30 and a light diffusion plate 31, which are arranged along a scan light axis L in this order listed from the lamp side.

The diaphragm 26 is consisted of a pair of plate members, each of which is movable in a direction of the arrow. A size of the opening of the diaphragm 26 is changed by moving the plate members. Thereby, a light amount of the scan light from the lamp 24 may be varied. The balance filter 27 includes a negative film filter 27a and a reversal film filter 27b, one of which is selectively inserted on the scan light axis L to adjust color temperature of the scan light. By passing through the light diffusion box 30 and the balance filter 27, the scan light becomes long and narrow, and is extended in a widthwise direction of the photo filmstrip 17. The scan light is diffused by the diffusion plate 31. Thereby, the scan light, uniformly extended in the widthwise direction, is applied to a recording surface of the photo filmstrip 17.

The film carrier 20 has a carrier base 33 for holding the photo filmstrip 17, a film mask 34 and feeding roller pairs 35, 36. The film mask 34 prevents displacement of the photo filmstrip 17 in the direction along the scan light axis L. A suitable film carrier 20 is set in the linear CCD scanner 11 in accordance with the film type of the photo filmstrip 17, for instance, ISO-135 type and IX240 type. The feeding roller pairs 35, 36 feeds the photo filmstrip 17, held in the film carrier 20, in a direction shown by arrows A, B, that is perpendicular to the scan light axis L. In the conveyance of the photo filmstrip 17 in the direction A, a pre-scan is carried out wherein the film image is scanned at a high speed and low resolution. On the other hand, in the conveyance in the direction B, a fine-scan is performed wherein the film image is scanned at a low speed and high resolution.

Image data obtained by the pre-scan is displayed on a display device. Checking up the displayed image, an operator can determine image processing conditions. Based on density and color characteristics of the pre-scanned image, scan conditions (intensity of the scan light, charge storage time of a CCD line sensor 40 and so forth) are also determined. Thereby, it is possible to prevent saturation of electrical charge in each pixel of the CCD line sensor 40 even when a scanned film image has extremely low densities.

The film mask 34 has a scan opening 34a which is overlapped with the scan light axis L and extended in the widthwise direction of the photo filmstrip 17. The scan light from the scan light source 21 is projected toward the image scan section 23 through the photo filmstrip 17 and the scan opening 34a.

The image scan section 23 has a lens barrel 37, the CCD line sensor 40 and a support plate 41. The CCD line sensor 40, held by the support plate 41, has a red CCD cell array, a green CCD cell array and a blue CCD cell array, which are arranged at certain intervals in a feeding direction of the photo filmstrip 17 (sub-scan direction). Each of the CCD cell arrays has a plurality of CCD cells arranged in line along the widthwise direction of the photo filmstrip 17 (main-scan direction). The scan light through the photo filmstrip 17 is projected on the linear CCD cell arrays, and photoelectrically converted into image data of respective color components which is sent to the image processing section 12.

The lens barrel 37 includes a fixed barrel 42, an axial movable barrel 43, a focus lens unit 44 and a thermometer 45. The fixed barrel 42, held by the support plate 41, has straight cam grooves 42a. The axial movable barrel 43 is held in the fixed barrel 42 in a rotatable manner, and has spiral cam grooves 43a. The focus lens unit 44 include plural lens elements, and is movable along the scan light axis L. An optical film image is focused on the photoreceiving surface of the CCD line sensor 40 through the focus lens unit 44. The focus lens unit 44 has cam pins 46, which are projected outwards and engages with the cam grooves 42a, 43a of the fixed barrel 42 and the axial movable barrel 43. When the axial movable barrel 43 rotates, the focus lens unit 44 moves along the scan light axis L.

A gear 48 is provided outside of the fixed barrel 42, and is engaged with the axial movable barrel 43 via engaging pins (not shown). The gear 48 is also connected with a gear 47a of a lens motor 47. The lens motor 47 is a stepping motor, and is actuated by drive pulses from a controller 53 (see FIG. 3). When the lens motor 47 is actuated, the axial movable barrel 43 rotates through the gear 48. Then, the focus lens unit 44 is moved along the scan light axis L, to change a magnification of the scanned film image. The rotation amount of the axial movable barrel 43 is corresponded to the position of the focus lens unit 44 on one-for-one basis, so it is possible to determine a magnification of the scanned film image in accordance with an amount of drive pulses to the lens motor 47 (rotation amount of the axial movable barrel 43).

The lens barrel 37 also has a well-known lens shutter for shielding dark current and a well-known diaphragm for adjusting light amount. Any suitable mechanisms for moving the focus lens unit 44 is applicable to the present invention. A zoom lens may be substituted for the focus lens unit 44.

A guide rod 50, extended in a direction parallel to the scan light axis L, is screwed into the support plate 41, and is connected with a focusing motor 52 through a gear 51. The focusing motor 52 is a stepping motor, and is actuated by drive pulses from the controller 53. A guiding mechanism (not shown) keeps the support plate 41 so as not to rotate but to slide along an axial direction of the guide rod 50. When the guide rod 50 rotates, the support 41 moves in a direction parallel to the scan light axis L, to change a length between the photo filmstrip 17 and the CCD line sensor 40 (focus distance). Thereby, a focusing operation of the focus lens unit 44 is executed.

The thermometer 45, disposed inside of the lens barrel 37, measures a temperature of the focus lens unit 44. A thermistor may be used as the thermometer 45. Temperature signals from the thermometer 45 is sent to the controller 53 (see FIG. 3), and is used in the focusing operation of the focus lens unit 44. The thermometer 45 may be positioned outside of the lens barrel 37.

Figure 3:
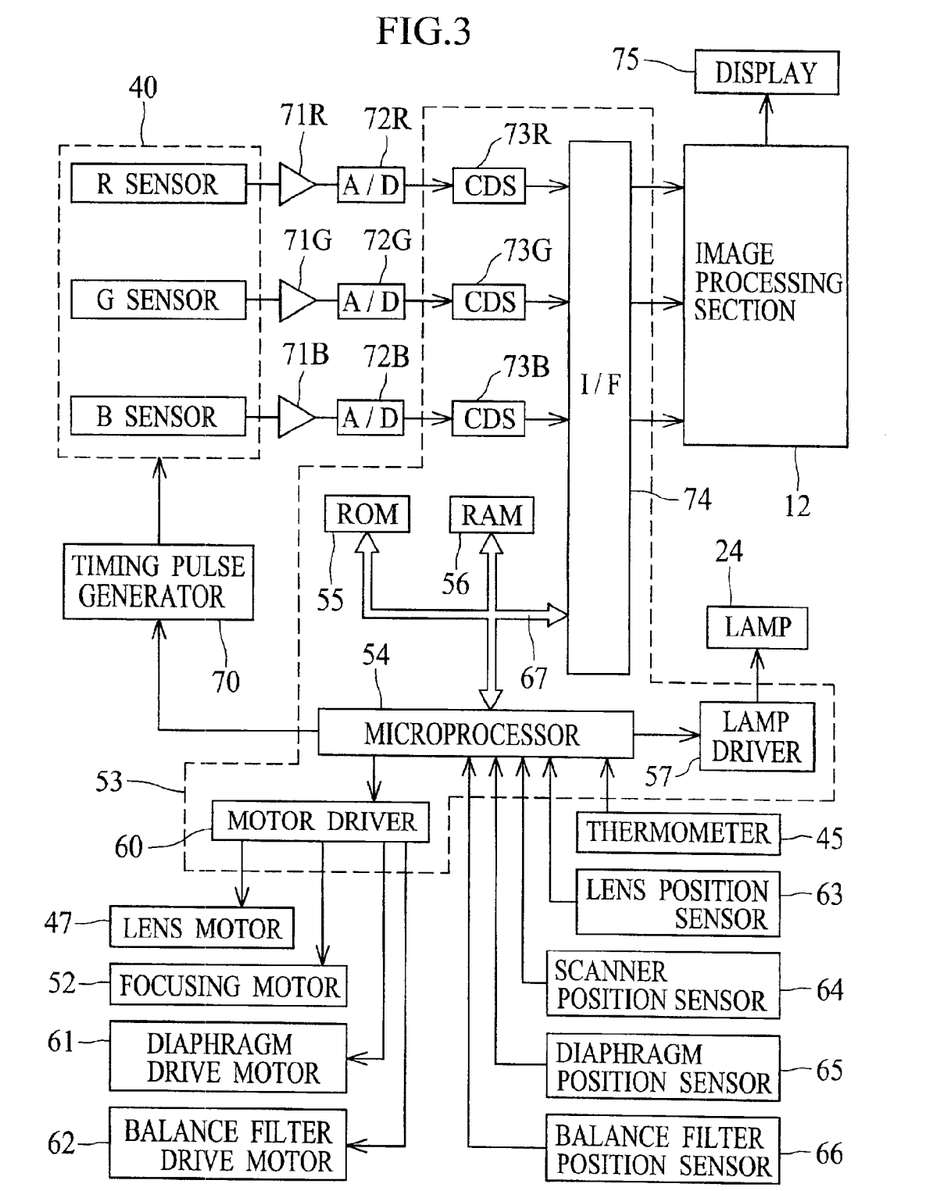
FIG. 3 is a block diagram showing a circuitry of the image scan apparatus.

FIG. 3 shows a circuitry diagram of the image scan apparatus 13, which has the controller 53 for controlling the CCD line sensor 40, kinds or motors and position sensors, and so forth. The controller 53 includes a microprocessor 54, a ROM 55, a RAM 56, a lamp driver 57 and a motor driver 60, all of which are connected to the microprocessor 54. The lamp driver 57 is connected to the lamp 24, and turns on and off the lamp 24 under the control of the microprocessor 54.

The lens motor 47, the focusing motor 52, a diaphragm drive motor 61, a balance filter drive motor 62, etc., are connected to the motor driver 60. A lens position sensor 63 for detecting a position of the focus lens unit 44 is connected to the lens motor 47. The microprocessor 54 sends drive pulses to the lens motor 47 based on position signals from the lens position sensor 63. The focusing motor 52 is connected to a scanner position sensor 64 for detection a position of the support plate 41. The scanner position sensor 64 monitors the position of the support plate 41 from an initial position, and sends signals to represent the position of the support plate 41 to the microprocessor 54.

The diaphragm drive motor 61 is actuated by the microprocessor based on position signals from the diaphragm position sensor 65, and controls a position of the diaphragm 26. The balance filter drive motor 62 is driven to change the balance filter 27 by the microprocessor 54 based on position signals from the balance filter position sensor 66. In accordance with a film type, either the negative film filter 27a or the reversal film filter 27b may be located on the scan light axis L.

Prior to the pre-scan and the fine-scan, the microprocessor 54 adjusts an amount of the scan light of respective color components. The microprocessor 54 also determines a scan area of the film image in accordance with film size and whether or not trimming is carried out, and drive the lens motor 47 so as to scan the film image in a determined scan area. The microprocessor 54 carries out a focus search operation to move the support plate 41 to a focus position, so that the light receiving surface of the CCD line sensor 40 coincides with the focus position of the focus lens unit 44.

Figure 4:
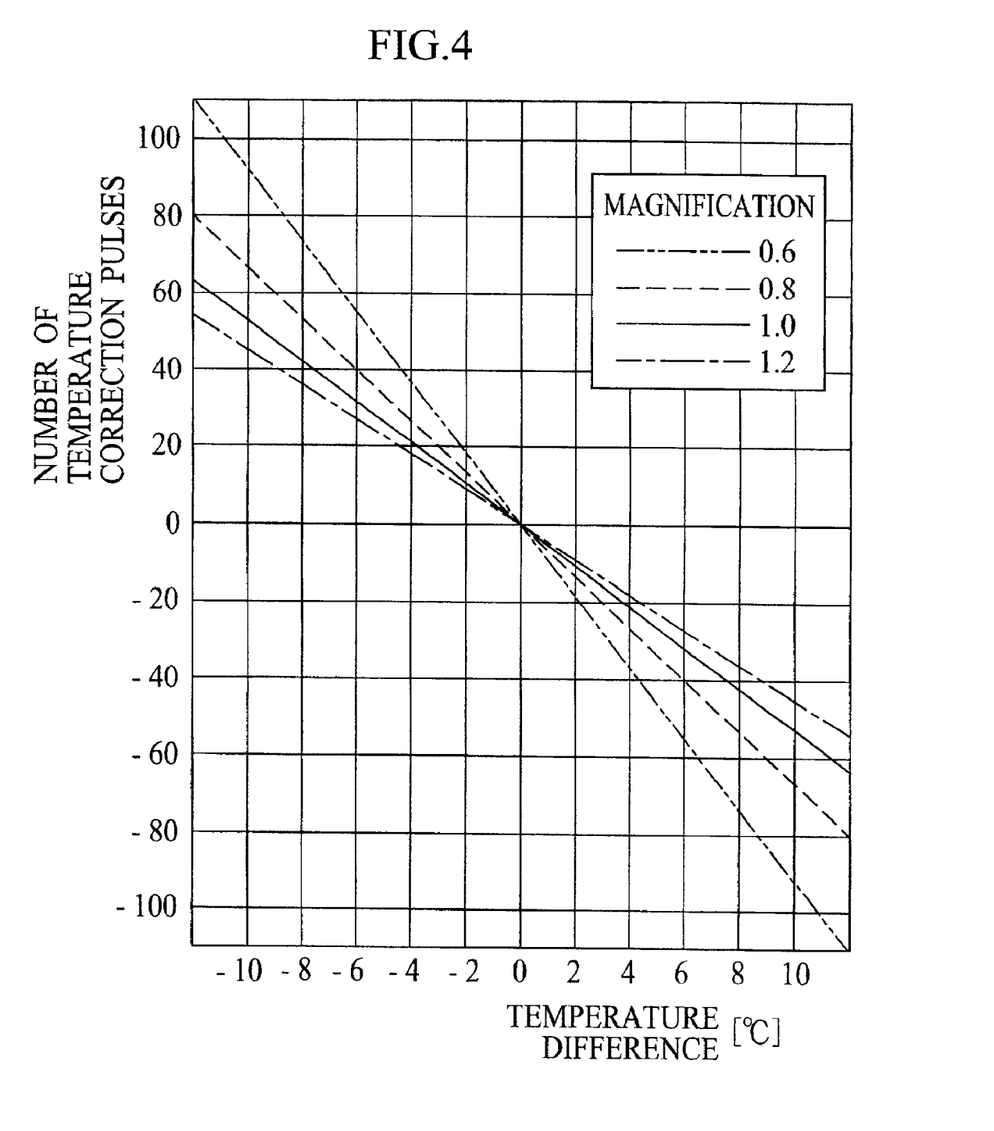
FIG. 4 is a graph showing a correction pulse table.

The ROM 55 and the RAM 56 are connected to the microprocessor 54 via a bus 67, and carry out data exchange therewith. The ROM 55 stores standard temperature data of the focus lens unit 44, standard movement data and temperature correction data for each magnification ratio and film carrier. Standard movement data represents a number of drive pulses to send the focusing motor 52 to move the support plate 41 from the initial position (hereinafter referred to as home position (H.P.)) to a standard focus position of the support plate 41 at the standard temperature. Temperature correction data represents a number of correction movement pulses to send the focusing motor 52 to move the support plate 41 to a focus position from the standard focus position which is determined in accordance with the difference between a measured temperature and the standard temperature. As shown in FIG. 4, the smaller the measured temperature is, the larger the correction movement pulses are designed. The ROM 55 stores lens movement data for representing a number of drive pulses to send the lens motor 47 to move the focus lens unit 44 in accordance with a magnification ratio.

These data are obtained by detecting a focus position under various temperature conditions before shipment or in the maintenance of the image scan apparatus 13. A focus calibration operation, which is disclosed in JP-A 2000-89374, may be applicable for detecting the focus position.

The RAM 56 stores focus search position data for representing a number of drive pulses to move the support plate 41 from the home position to a focus position. The focus search position data is obtained by performing the focus search operation, which will be described below. The RAM 56 also stores focus search temperature data for representing temperature of focus lens unit 44 measured in the focus search operation. In each focus search operation, these data is rewritten in the RAM 56 as set focus position data and set temperature data.

CCD line sensor 40 is connected to the controller 53 through a timing pulse generator 70. The timing pulse generator 70 generates timing pulses (clock signals) for synchronizing the operations of the CCD line sensor 40 and A/D converters 72R, 72G, 72B. After amplification by amplifiers 71R, 71G, 71B, image signals of respective color components from the CCD line sensor 40 is digitally converted into digital image data by the A/D converters 72R, 72G, 72B. Image data represents the amount of transmitted light through the photo filmstrip 17, and is sent to correlated double sampling circuit (CDS) 73R, 73G, 73B.

In the CDS 73R, 73G, 73B, feed through data and image data are subject to sampling. Then, feed through data is subtracted from image data in respective pixels, to obtain image data of red, green and blue, which is correctly corresponded to charged electricity in each CCD cell. Image data of respective color component is output in parallel from CDS 73R, 73G, 73B, and sent to the image processing section 12 through an interface (I/F) circuit 74 as scanned image data.

The image processing section 12 displays a pre-scanned image on a display 75 after various image processing. Based on the pre-scanned image, the image processing section 12 determines a scan frame and scan conditions for the fine-scan of the designated frame. A fine-scanned image is subject to various image processing, including gradation correction, density correction, hue correction, hyper tone process to compress the gradation of ultra low frequency brightness components of an image, hyper sharpness process to enhance sharpness while suppressing graininess, and the like. Processed image data of designated frame is sent to the laser printer 14.

The laser printer 14 includes laser devices or red, green and blue, and a modulation circuit for modulating light intensities of laser beams in accordance with processed image data. And the modulated laser beams are applied onto a photographic paper in a line-sequential manner, to record a latent image thereto. The processor 15 carries out development, fixation, washing and drying processes to the exposed photographic paper. Thereby, a latent image is developed into a positive image, to obtain a print picture.

Figure 5:
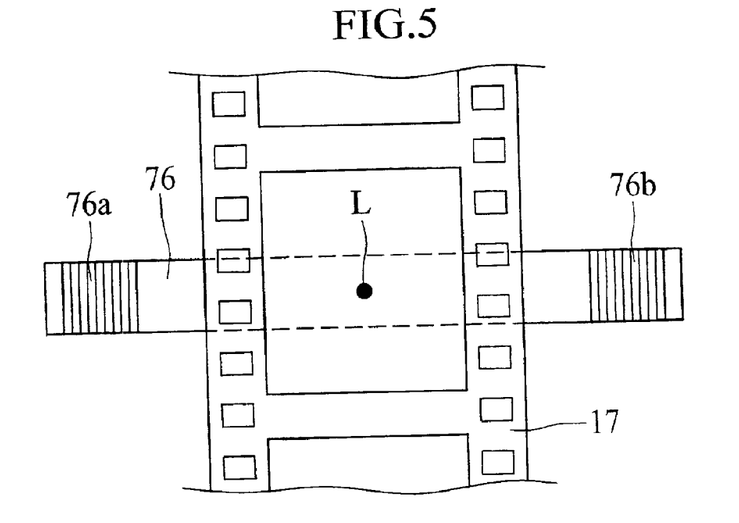
FIG. 5 is an explanatory view showing a relationship in positions between a photo film and a glass member.

Referring to the drawings of FIGS. 5 to 8, the sequence of the focus search process will be described. In FIG. 5, a support member 76 is located on the carrier base 33 below the photo filmstrip 17 such that the center of the support member 76 coincides with the scan light axis L. The support member 76 is made of a transparent material such as glass, and is extended in the main-scan direction of the photo filmstrip 17. On both lateral end portions of the support member 76 are provided a pair of focus charts 76a, 76b which are symmetrical with respect to the scan light axis L. Each of the focus charts 76a, 76b has plural lines extended in the sub-scan direction. It is possible to provide transparent material only in portions of the support member 76 on which the focus charts 76a, 76b are provided, or only in portions on which the focus charts 76a, 76b and perforations are provided. In those cases, an opening is required to pass the scan light through an image recorded area of the photo filmstrip 17.

Figure 6:
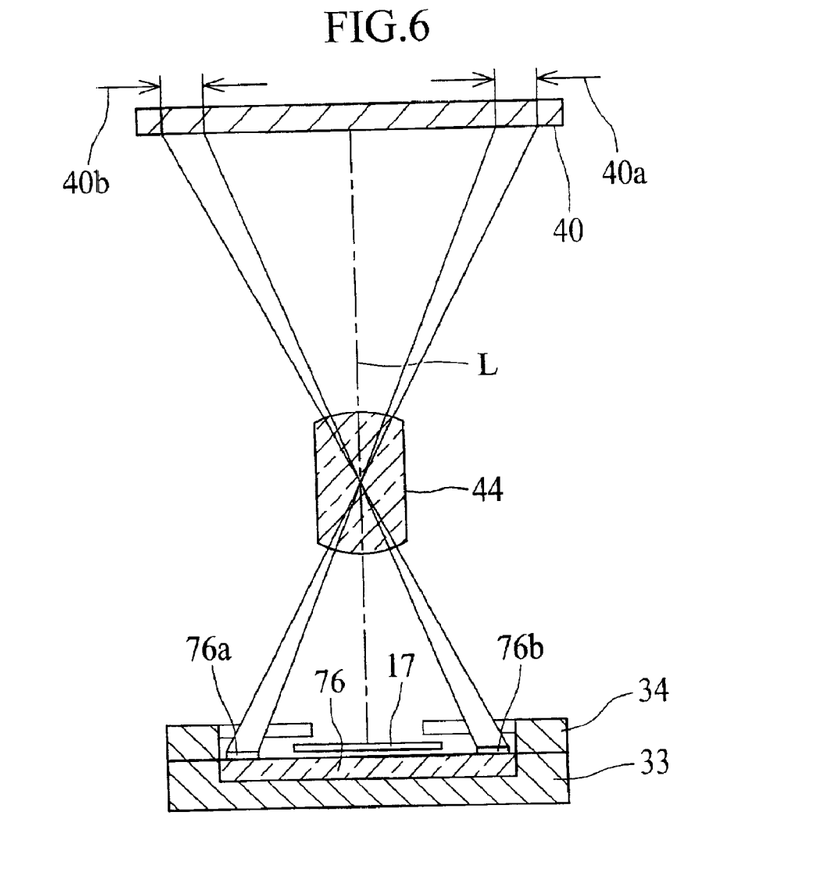
FIG. 6 is an explanatory view showing that chart images are focused on a CCD linear sensor.

As shown in FIG. 6, light from the charts 76a, 76b is applied to both end portions 40a, 40b of the CCD line sensor 40 through the focus lens unit 44. On the basis of the amount of light applied to the end portions 40a, 40b, the focus positions for the focus charts 76a, 76b are decided.

Since the focus position of the focus lens unit 44 are varied when the measured temperature is different from the standard temperature, it is needed to correct the standard focus position in accordance to the difference between the measured temperature and the standard temperature. The microprocessor 54 has an access to the ROM 55 to read standard pulse number data at a scan magnification in the fine-scan. The microprocessor 54 also reads out standard temperature data from the ROM 55.

Next, the microprocessor 54 measures a temperature of the focus lens unit 44 by use of the thermometer 45, and calculates the temperature difference from the standard temperature. By substituting the temperature difference and the scan magnification for the correction table of FIG. 4, temperature correction data is obtained. Then, the microprocessor 54 adds correction movement data to standard movement data, to calculate movement to an provisional focus position (number of drive pulses to send the focusing motor 52). The microprocessor 54 also determines a search area around the provisional focus position, as shown in FIG. 7.

Figure 7:
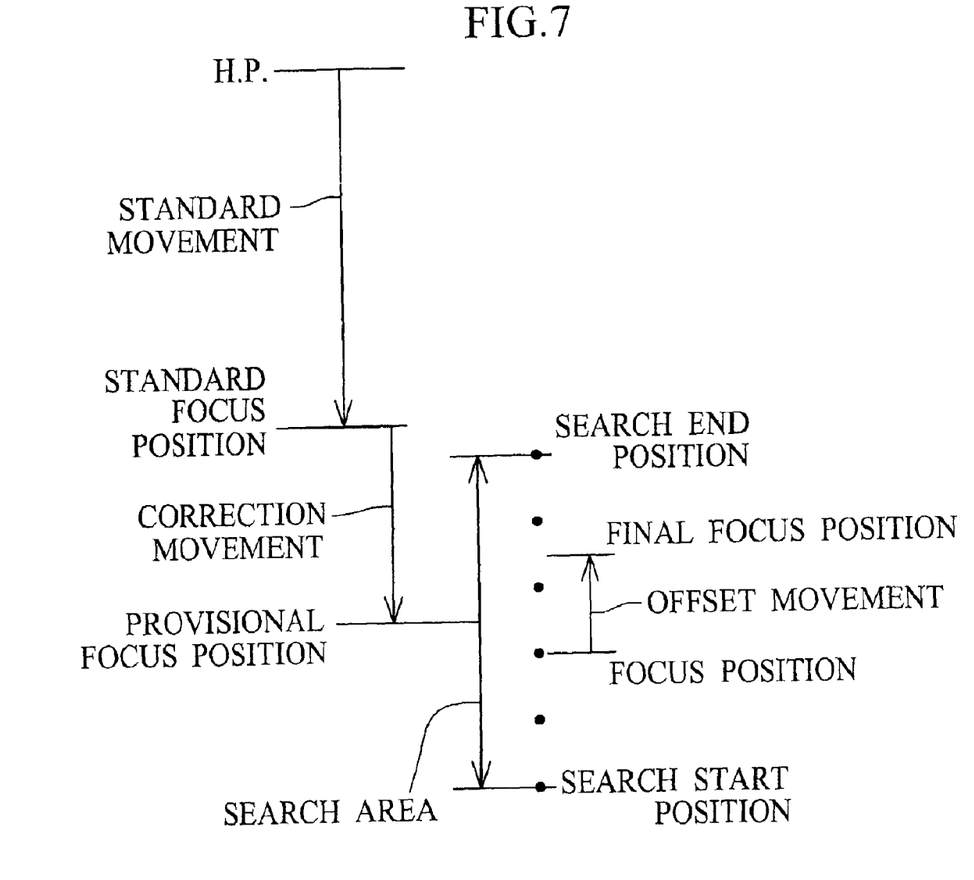
FIG. 7 is an explanatory view showing relationships between an initial position, a standard focus position, a provisional focus position, a search area and a focus position.

After determining the search area, the microprocessor 54 drives the focusing motor 52 to move the support plate 41 to a search start position shown in FIG. 7. While moving the support plate 41 toward a search end position, the microprocessor 54 reads images of the focus charts 76a, 76b at certain intervals in the search area. In this embodiment, the focus charts 76a, 76b are read at six positions in the search area, but the number may be changed.

Figure 8:
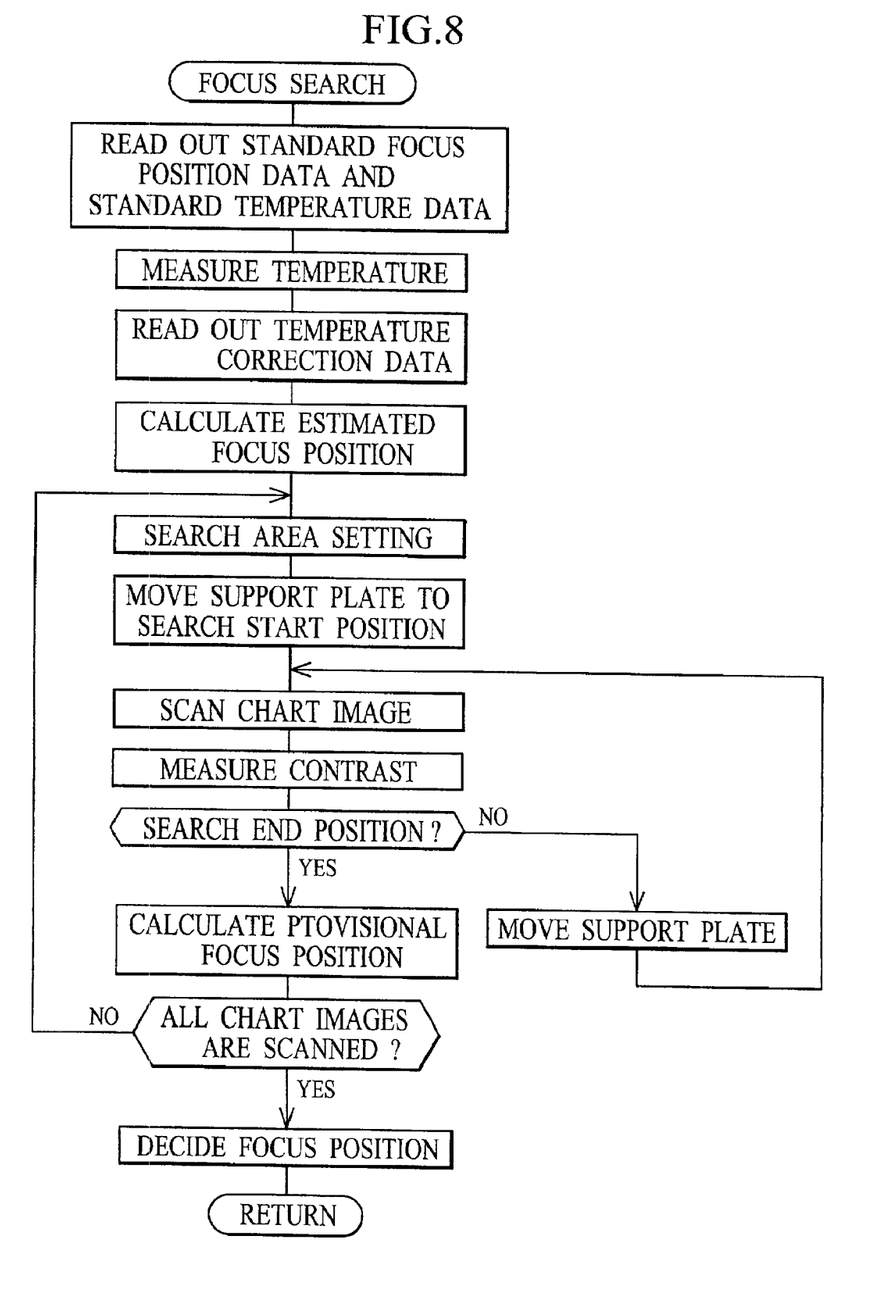
FIG. 8 is a flow chart showing a sequence of a focus search operation.

When the focus charts 76a, 76b are scanned, the microprocessor 54 measures a contrast values of the focus charts 76a, 76b, and stores the contrast values in the RAM 56. The contrast value means a running mean of an integrated MTF value over a certain special frequency range of the scanned chart image. The same process as above is carried out until the support plate 41 reaches the search end position.

When the support plate reaches the search end position, the microprocessor 54 stops the support plate 41. Then, the microprocessor 54 measures a first chart focus position KA in which the contrast value of the chart 76a becomes the largest. The microprocessor 54 also measures a second chart focus position KB in which the contrast value of the other chart 76b is the largest. Since the scan area in the photo filmstrip 17 is located between these two charts 76a, 76b, the focus position FP may be calculated by the following equation:

$$FP=(KA+KB)/2$$

Thereby, the microprocessor 54 can obtain focus position data (drive pulse data to the focus position). The ROM 55 has offset data for compensating difference in the direction of the scan light L between the upper surface of the charts 76a, 76b and the recording surf ace of the photo filmstrip 17. By adding the offset data to the measured focus position data, the microprocessor 54 obtains a drive pulse number to move the support plate 41 to a final focus position. When the support plate 41 is moved to the final focus position, the focus search operation is finished.

Figure 9:
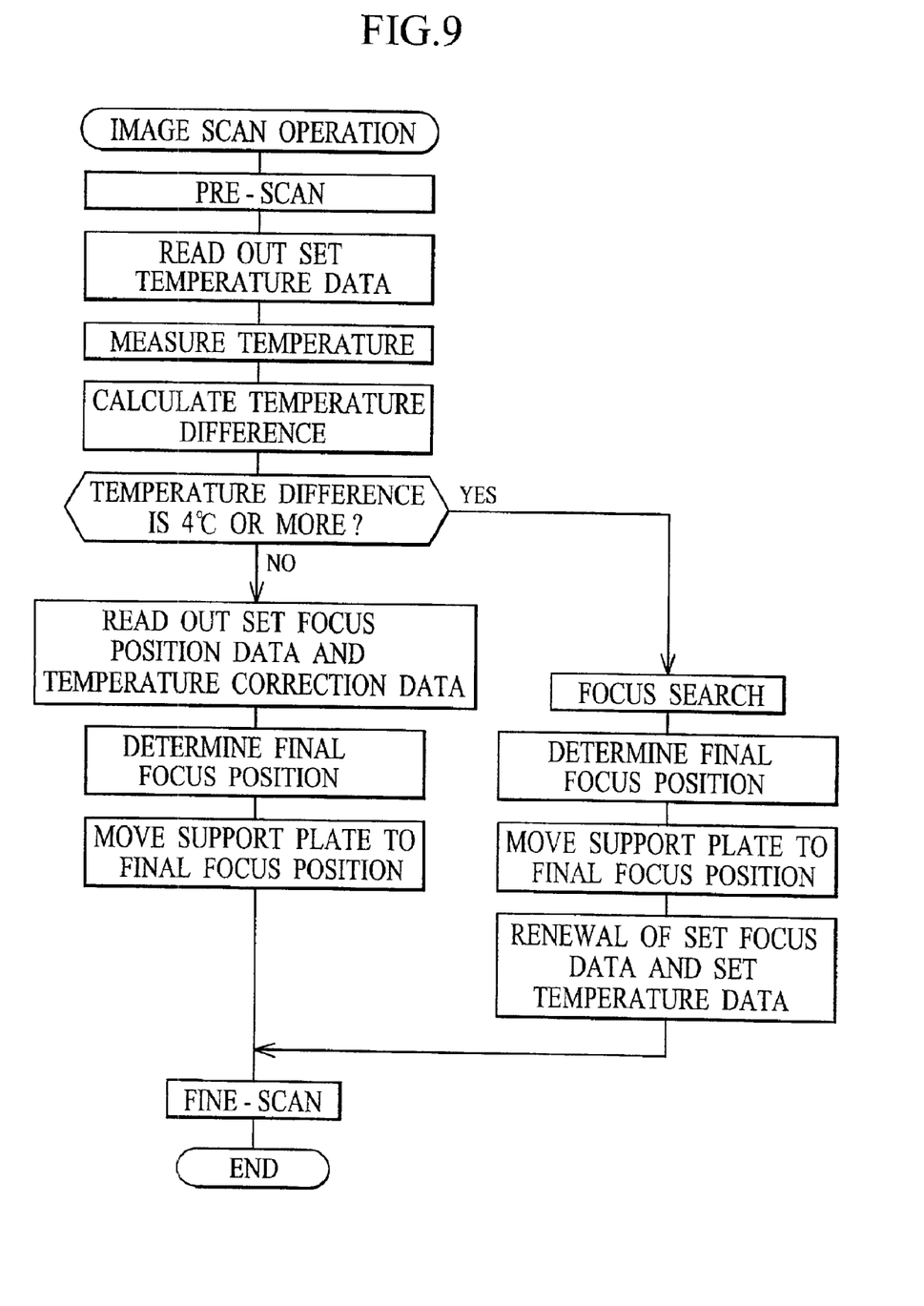
FIG. 9 is a flow chart of an image scan operation.

Next, referring to FIG. 9, an image scan process will be described. When the image scan apparatus 13 is powered, the focus search operation is carried out as well as a scanner characteristics correction. Focus position data and measured temperature data, obtained by the initial focus search operation, are stored in the RAM 56 as set focus position data and set temperature data.

Image scan process may be started after the photo filmstrip 17 is held in the film carrier 20. At first, the pre-scan is carried out by scanning the film image at a low resolution while moving the photo filmstrip 17 at a high speed. The microprocessor 54 drives the light source driver 57 to turn on the scan light source 24, drives the diaphragm drive motor 61 to move the diaphragm 26 to an initial position, and drives the balance filter drive motor 62 to move the balance filter 27 to a position determined according to film type. The microprocessor 54 also drives the lens motor 47 and the focusing motor 52 to move the focus lens unit 44 and the support plate 41 such that the magnification of the film image becomes a predetermined value. Thereafter, the microprocessor 54 drives the CCD image sensor 40 to scan the film image while moving the photo film 17 at a speed which is five times faster than the fine-scan speed, for instance.

Image data of the film image obtained by the pre-scan is sent to the image processing section 12, in which various image processing is carried out. The processed image is displayed on the display 75. Viewing the displayed image, an operator selects a frame for the fine-scan to determine a scan start position of the photo filmstrip 17. If necessary, the operator can correct image processing conditions of the image processing section 12, such as contrast and hue of the scanned image.

The microprocessor 54 detects the temperature of the focus lens unit 44 by a temperature signal from the thermometer 45, and compares the measured temperature and the set temperature which is stored in the RAM 56. When no set temperature data is stored in the RAM 56, the microprocessor 54 reads out standard temperature data from the ROM 55. If the temperature of the focus lens unit 44 is not changed so much, variation of refractive index of the lens elements of the focus lens unit 44 is so small that it is possible to make accurate focusing operation without the focus search operation. In this embodiment, when the temperature difference between the measured temperature and the set temperature is less than 4° C., the microprocessor 54 reads set focus position data which is stored in the RAM 56 at the previous focus search operation. Then, based on the temperature difference and scan magnification, the microprocessor 54 reads temperature correction data from the ROM 55, and adds the temperature correction data to the set focus position data so that focus position data is obtained. The microprocessors 54 moves the support plate 41 to the final focus position after adding offset data to focus position data. Thereby, it is possible to omit the focus search operation and shorten a whole scan time from the pre-scan to the fine-scan.

On the other hand, if the temperature difference is equal to or more than 4° C., variations in refractive indexes of the focus lens unit 44 and the focus position are increased. Moreover, fluctuation in focus position for each lens unit stands out. Then, the microprocessor 54 carries out the above described focus search operation to obtain a correct focus position, and drives the focusing motor 52 to move the support plate 41 to the focus position. Focus position data and temperature data, obtained by the focus search operation, are written in the RAM 56 as set focus position data and set temperature data.

After the focusing operation of the focus lens unit 44, the fine-scan is started. The film carrier 20 moves the photo filmstrip 17 in the direction B (see FIG. 2). Based on frame position data stored in the ROM 55, the microprocessor 54 monitors the position of the frame to be scanned. When a recording area of the scan frame coincides with the scan start position, the microprocessor 54 drives the CCD linear sensor 40 to scan the film image, and produces digital image data in sequential manner. Image data is output to the image processing section 12 to carry out kinds of image processing.

Next, the operation of the above configuration will be described. Upon powering the digital print system 10, the image scan apparatus 13, the laser printer section 14 and the processor section 15 are powered to carry out predetermined initial operations, in which the focus search operation is carried out after a scanner characteristics correction process. Focus position data and temperature data, obtained by the focus search operation, is written in the RAM 56 as set focus position data and set temperature data.

When an operator enters a scan command, the microprocessor 54 carries out the pre-scan to determine scan conditions for the fine-scan. Then, the microprocessor 54 compares the measured temperature data from the thermometer 45 and set temperature data stored in the RAM 56. When the difference between the measured temperature and the set temperature is less than 4° C., the microprocessor 54 calculates the focus position from set focus position data in the RAM 56 and temperature correction data stored in the ROM 50. Then, the microprocessor 54 calculates the final focus position by adding offset data, and moves the support plate 41 to the final focus position. Thereafter, the fine-scan is carried out without carrying the focus search operation.

Temperature correction data in the ROM 55 is determined in consideration of characteristics of the focus lens unit 44 and expansion of members for comprising the image scan section 23 against temperature change. Thus, it is possible to perform accurate focusing of the focus lens unit 44 without the focus search operation, and to shorten the whole scan time from the pre-scan to the fine-scan.

On the other hand, when the temperature difference is equal to or more than 4° C., the microprocessor 54 executes the focus search operation to decide the focus position, and moves the support plate 41 to the final focus position. Focus position data and temperature data, obtained by the focus search operation, is written in the RAM 56 as set focus position data and set temperature data. Since the temperature change of the focus lens unit 44 is considered to be small in case of scanning plural images successively, the focus search operation may be omitted. Thus, the whole scan time may be shortened.

A scanned image obtained by the fine-scan is displayed on the display 75 after image processing. When the operator enters a print command, image data of the displayed image is sent to the laser printer section 14, in which printing laser beams are applied onto a photographic paper to expose a latent image. The exposed photographic paper is forwarded to the processor section 15, in which the photographic paper is subject to development, fixation, washing and drying processes. Thereby, a positive image is appeared in the photographic paper, to obtain a print picture.

It is possible to store focus position data obtained by the focus search operation to the RAM 56, and to carry out focusing operation by use of the focus position data. Referring to flow charts shown in FIGS. 10, 11, the second embodiment of the present invention will be described.

Figure 10:
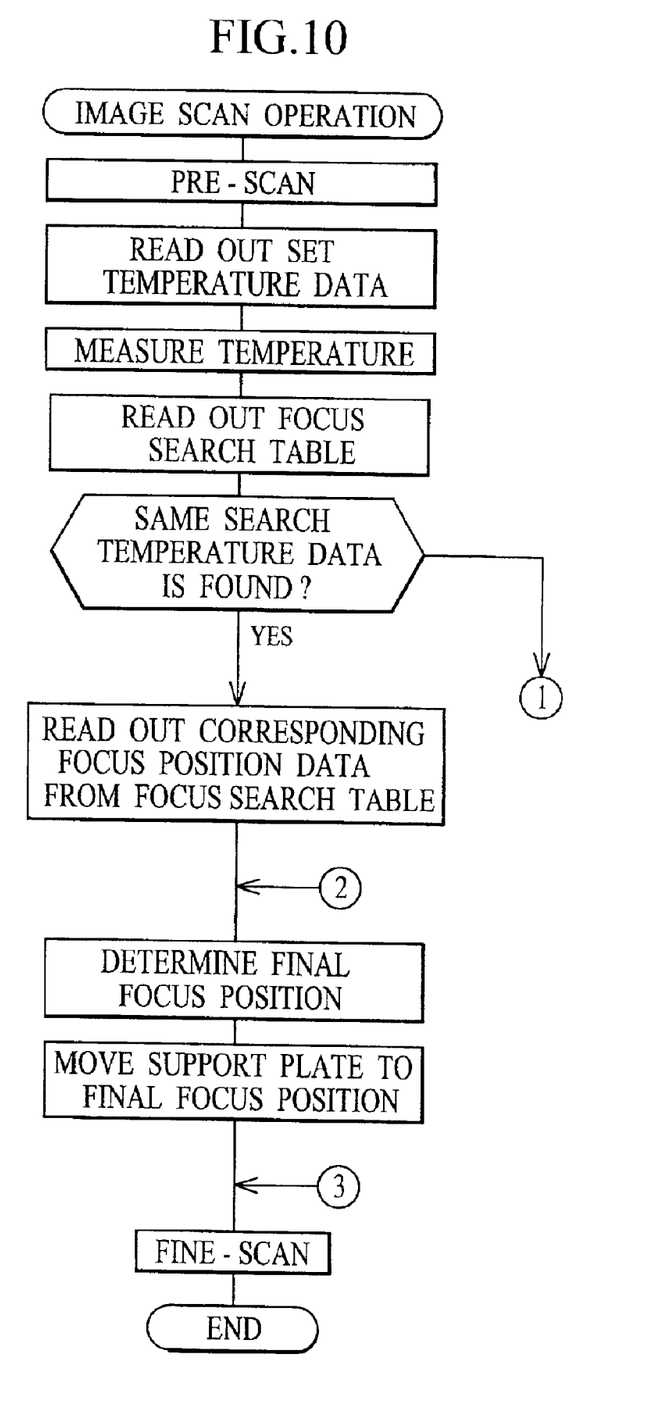
FIGS. 10 and 11 are flow charts showing another sequence of the image scan operation.
Figure 11:
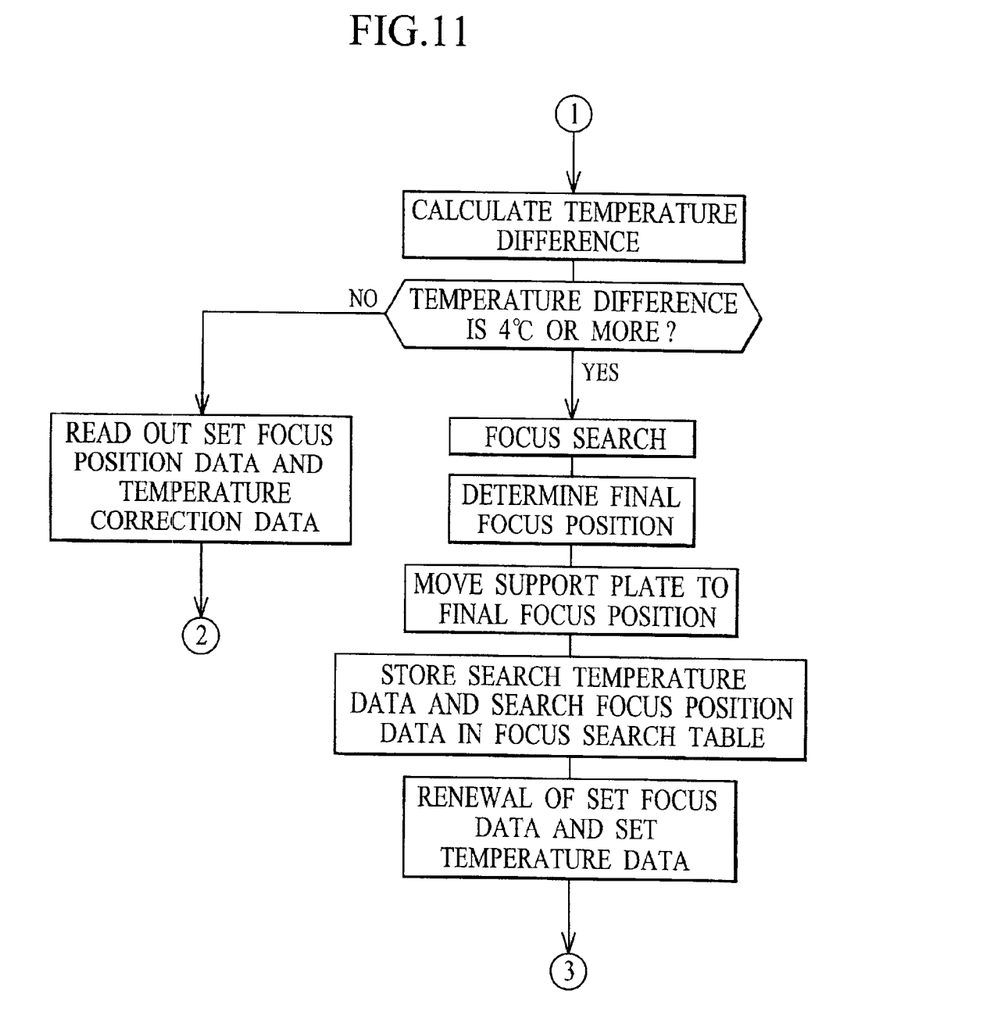

When the scan conditions for the fine-scan are determined after the pre-scan, the thermometer 45 measures the temperature of the focus lens unit 44. Then, the microprocessor 54 reads a focus search table, stored in the RAM 56, which stores search temperature data and search focus position data obtained by the focus search operation. The microprocessor 54 detects whether or not the measured temperature coincides with the search temperature data stored in the focus search table. If same search temperature data as the measured one is found in the focus search table, the microprocessor 54 reads the corresponding search focus position data, and moves the support plate 41 to the final focus position which is determined by the search focus position data in the focus search table.

If there is no identical search temperature data, the microprocessor 54 measures the temperature difference between the measured temperature and set temperature data stored in the RAM 56. When the temperature difference is less than 4° C., the microprocessor 54 adds temperature correction data in the ROM 55 to set focus position data stored in the RAM 56, to calculate the focus position without executing the focus search operation. Thereafter, the support plate 41 is moved to the final focus position which is calculated by adding offset data to focus position data. On the other hand, when the temperature difference is equal to or more than 4° C., the microprocessor 54 carries out the focus search operation to measure the focus position, and moves the support plate 41 to the final focus position. Then, the microprocessor 54 stores focus position data and temperature data, obtained in the focus search operation, as search focus position data and search temperature data in the focus search table of the RAM 56. The microprocessor 54 also renews set focus position data and set temperature data, in the same way as the first embodiment.

After the above focusing operation, the fine-scan is carried out to scan the film image at a high resolution. Image data obtained by the fine-scan is sent to the image processing section 12, and finishes the image scan operation. In the second embodiment, focusing operation may be carried out by measuring the temperature if the measured temperature is coincident with stored search temperature data. Thus, the whole scan time becomes shorter.

In the second embodiment, focus position data is read out only when the measured temperature coincides with search temperature data in the focus search table. But it is also possible to determine certain temperature ranges around search temperature data stored in the focus search table, and to read out corresponding focus position data if the measured temperature is within the temperature range. Moreover, the focus position may be calculated by interpolation based on search temperature data and focus position data which are stored in the focus search table.

Temperature correction data may be stored in the RAM 56. In that case, temperature correction data may be rewritten in exchanging the focus lens unit 44. By use of temperature correction data that is suitable for optical characteristic of each focus lens unit, it is possible to carry out focusing operation more accurately.

Since the thermometer 45 is separated from the focus lens unit 44, measured temperature does not represent the correct temperature of the focus lens unit 44, but a temperature in the vicinity of the focus lens unit 44. Because of the difference in the thermal conductivities between the focus lens unit 44 and air, the actual temperature of the focus lens unit 44 seems to be different from the measured temperature. In consideration of a time that the temperature of the focus lens unit 44 follows the measured temperature, a time lag may be provided. When the time lag is set to five seconds, temperature data obtained five seconds before the focusing operation is used. Length of the time lag may be decided in accordance with characteristics of lens elements of the focus lens unit 44 and with fluctuation in temperature of air around the focus lens unit 44.

In the above embodiments, the temperature difference to determine to carry out the focus search operation is set to 4° C., but this temperature difference is not limited to the above embodiments, and may be changed in accordance with necessary depth in field and thermal characteristic of the lens elements. Measurement of the temperature of the focus lens unit 44 may be carried out before the pre-scan. The focus search operation may be carried out when the film carrier or the photo filmstrip is exchanged. Moreover, set temperature data in the RAM 56 may be used in the focus search operation instead of standard temperature data in the ROM 55.

The ROM 55 may store temperature correction equation to represent the relationship between the temperature difference and the focus position, shown in FIG. 4. In that case, it is possible to calculate the focus position by substituting temperature difference for the temperature correction equation.

In the above embodiments, the focus search operation is carried out by use of focus charts 76a, 76b, but the photo filmstrip 17 may be used for the focus search operation, as disclosed in JP-A 2000-89374. In consideration of curve of the photo filmstrip 17, the microprocessor 54 measures three focusing positions at both lateral ends and the center thereof with respect to the main-scan direction. And the focus position for the fine-scan may be calculated based on measured three focusing positions.

The present invention is not limited to scan a transparent original like a photo filmstrip, but it is possible to scan a reflective original such as recording paper. In that case, an image is scanned by use of scan light which is reflected by the recording paper.

Thus, the present invention is not to be limited to the above embodiments, but on the contrary, various modifications are possible to those skilled in the art without departing from the scope of claims appended hereto.

What is claimed is:

1. An image scan apparatus having a projection lens and an image sensor for photoelectrically converting an optical image of an original that is formed through said projection lens, said apparatus comprising:

a thermometer for measuring a temperature of said projection lens;

a support member for holding said image sensor and said projection lens, said support member being movable along an optical axis of said projection lens;

focus control means for focusing said projection lens by controlling position of said support member along said optical axis, said focus control means carrying out a focus search operation for searching a focus position of said support member while moving said support member along said optical axis, at said focus position a focal surface of said projection lens being located on said image sensor;

a first memory which stores said focus position obtained through said focus search operation as a set focus position, and a temperature of said projection lens measured through said thermometer as a set temperature; and a second memory which stores respective correction amounts on said set focus position in relation to temperature differences;

wherein said focus control means obtains a temperature difference between a temperature of said projection lens measured during focusing said projection lens and said set temperature stored in said first memory, reads out one of said correction amounts from said second memory in accordance with said obtained temperature difference when said obtained temperature difference is less than a predetermined value, correcting said set focus position, stored in said first memory, with said read correction amount, to obtain a corrected focus position, and sets said support member to said corrected focus position.

2. An apparatus as claimed in claim 1, wherein when said difference between said set temperature and said measured temperature of said projection lens is not less than said predetermined value, said focus control means carries out said focus search operation again to obtain a new focus position, sets said support member to said new focus position, and renews data of said first memory by writing in said first memory said new focus position and a temperature of said projection lens newly measured through said thermometer.

3. An apparatus as claimed in claim 2, further comprising magnification setting means for setting scan magnification of said projection lens, wherein said second memory stores said correction amounts for each of available magnifications.

4. An apparatus as claimed in claim 2, wherein said focus control means sets said support member to said corrected focus position after pre-scanning and before fine-scanning, said pre-scanning being made to scan said image at a low resolution for determining scanning conditions, and said fine-scanning being made to scan said image at a high resolution.

5. An apparatus as claimed in claim 2, wherein said focus control means carries out said focus search operation when said apparatus is powered or when a carrier carrying said original is set in said apparatus.

6. An apparatus as claimed in claim 2, wherein said memory has a conjugate length table for sequentially storing respective couples of focus positions of said support member and temperatures of said projection lens which have been obtained through said focus search operations, as said set focus positions and said set temperatures; and wherein said focus control means selects from said conjugate length table a nearest one of said set temperatures to said measured temperature that is measured during focusing said projection lens, obtains a temperature difference between said selected set temperature and said measured temperature, and when said temperature difference is less than said predetermined value, said focus control means selects one of said set focus positions that is related to said selected set temperature, and determines said corrected focus position based on one of said correction amounts that corresponds to said temperature difference, and said selected set focus position.

7. An apparatus as claimed in claim 2, wherein said correction amounts are determined in accordance with characteristics of said projection lens.

8. An apparatus as claimed in claim 2, wherein said temperature of said projection lens is measured a predetermined time before it is needed.

9. A focus control method of focusing a projection lens to form an optical image of an original on an image sensor, said projection lens and said image sensor being held by a support member that is movable along an optical axis of said projection lens, said focus control method comprising:

A. measuring a temperature of said projection lens during focusing said projection lens;

B. obtaining a temperature difference between said measured temperature and a predetermined set temperature;

C. when said temperature difference is less than a predetermined value, reading out a set focus position from a first memory, said first memory storing said set temperature of said projection lens and said set focus position at said set temperature;

reading out a correction amount from a second memory in accordance with said temperature difference, said second memory storing correction amounts corresponding to respective temperature differences;

calculating a corrected focus position based on said set focus position read out from said first memory and said correction amount read out from said second memory; and moving said support member to said corrected focus position, to focus said projection lens; and D. when said temperature difference is not less than said predetermined value, carrying out a focus search operation for searching a focus position of said support member while moving said support member along said optical axis, at said focus position a focal surface of said projection lens being located on said image sensor;

writing in said first memory a temperature of said projection lens measured during said focus search operation as a new set temperature, and said focus position obtained through said focus search operation as a new set focus position; and moving said support member to said new set focus position, to focus said projection lens.

10. A method as claimed in claim 9, wherein said focus search operation comprises the following steps:

obtaining a temperature difference between a predetermined standard temperature and said measured temperature of said projection lens obtained during said focus search operation;

reading out from said second memory a correction amount that corresponds to said temperature difference;

obtaining a provisional focus position by correcting a predetermined standard focus position that is associated with said standard temperature, with said read correction amount; and determining said focus position while moving said support member within a search area that is determined with reference to said provisional focus position.

11. A method as claimed in claim 10, wherein said projection lens is variable in magnification and said correction amounts and said standard focus positions are predetermined for each of available magnifications.

12. A method as claimed in claim 9, further comprising the steps of:

storing respective couples of focus positions of said support member and measured temperatures of said projection lens, which have been obtained through said focus search operations, as said set focus positions and said set temperatures in said first memory sequentially in an accumulating manner;

selecting from said first memory a nearest one of said set temperatures to a temperature measured during focusing of said projection lens;

obtaining a temperature difference between said selected set temperature and said measured temperature; and selecting, when said temperature difference is less than said predetermined value, one of said set focus positions that is related to said selected set temperature, to obtain said corrected focus position by correcting said selected set focus position with one of said correction amounts that corresponds to said temperature difference.

13. A method as claimed in claim 9, wherein said correction amounts are determined in accordance with characteristics of said projection lens.

14. A method as claimed in claim 9, wherein said temperature of said projection lens is measured a predetermined time before it is needed.

* * * * *